Aug. 5, 1930.　　　　G. F. WELLS　　　　1,772,171
ELECTRICAL COOKING DEVICE
Filed Aug. 7, 1926　　　3 Sheets-Sheet 1

Inventor
George F. Wells
by John Flam
Attorney

Aug. 5, 1930.                G. F. WELLS                1,772,171
                       ELECTRICAL COOKING DEVICE
                    Filed Aug. 7, 1926      3 Sheets-Sheet 2
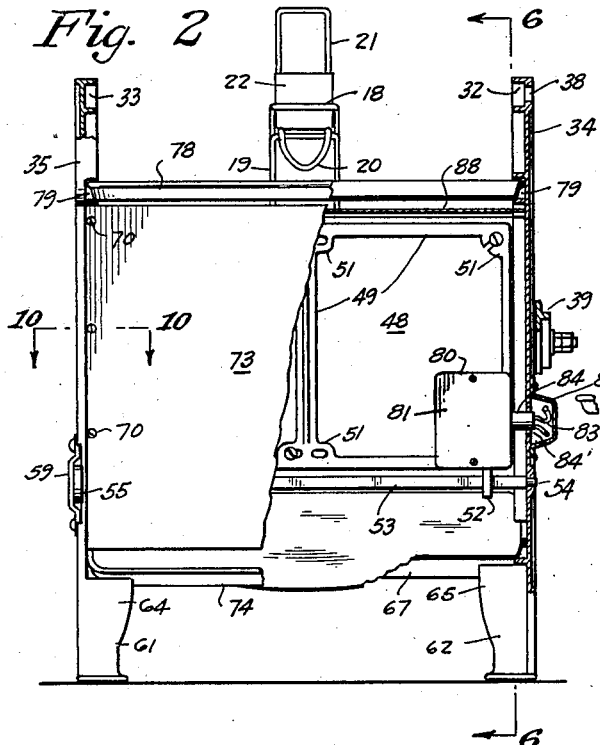
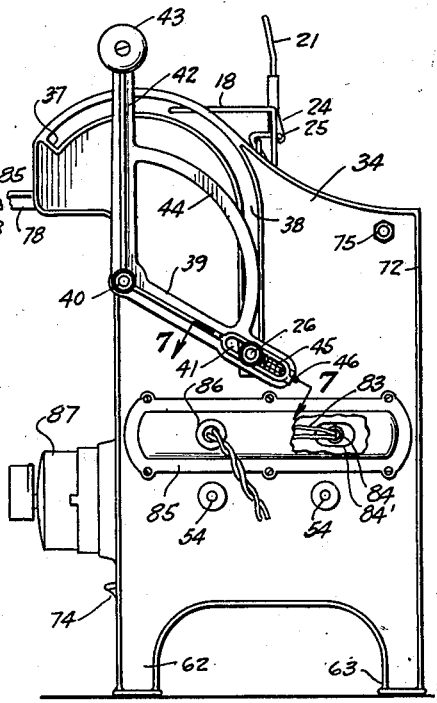
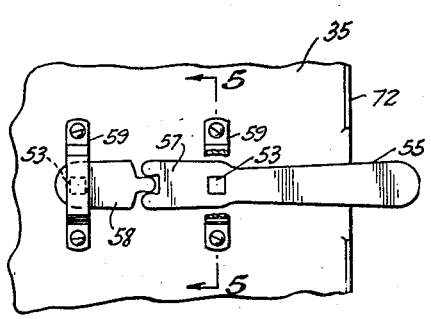
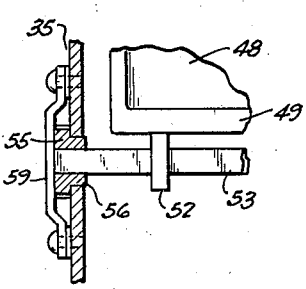
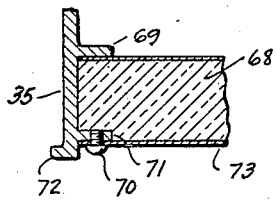
Inventor
George F. Wells
by John Flam
Attorney Aug. 5, 1930.  G. F. WELLS  1,772,171
ELECTRICAL COOKING DEVICE
Filed Aug. 7, 1926  3 Sheets-Sheet 3

Inventor
George F. Wells
by John Flam
Attorney

Patented Aug. 5, 1930

1,772,171

UNITED STATES PATENT OFFICE

GEORGE F. WELLS, OF SAN FRANCISCO, CALIFORNIA

ELECTRICAL COOKING DEVICE

Application filed August 7, 1926. Serial No. 127,868.

This invention relates to electrical cooking, and more particularly to an electrically heated broiler.

It is one of the objects of my invention to provide an electrically heated device of this character that is simple and inexpensive to manufacture.

It is another object of my invention to provide a cooking device that can thoroughly broil meats in a comparatively short time. This is partly due to the use of double heating elements, one on each side of the food to be cooked, whereby a large amount of heat can be quickly imparted thereto.

For restaurant service, such speed is highly desirable. It is also essential to provide a device that can withstand severe usage; and accordingly it is another object of my invention to provide a rugged restaurant type of broiler.

With my invention, the food to be cooked is held in a grid or rack. It is well-known that during the process of broiling, much of the fat is exuded, and drips from the broiling meat. These drippings, if permitted to continue without special provisions, would render the entire broiler soon unfit and unsanitary. It is another object of my invention to provide a broiler that can very readily be kept free of accumulated drippings; this I accomplish by the aid of one or more removable pans to catch the drip, and also by supporting the meat in the broiler in substantially a vertical position.

Since the loading of the rack in such position would be awkward, I obviate this by providing alternate positions for the rack: a horizontal loading position, in which the rack is away from the influence of the heating elements; and a vertical operating position, adjacent the heating elements.

The meat being in a vertical position while being broiled, a vertical passageway between it and the heating elements is formed, which might serve as a flue, wastefully dissipating the heat from the elements by convection currents. It is another object of my invention to interrupt these currents; and especially by the aid of one or more of the drip pans heretofore mentioned.

In some instances, the heating elements should be placed closer to the meat to be broiled, than in other cases. It is still another object of my invention to make it possible, in a simple manner, to adjust the spacing between the elements and the food to be cooked.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 2 is a front view thereof, partly broken away and partly in section;

Fig. 3 is a side elevation thereof, taken from the right of Fig. 2;

Fig. 4 is a detail view of a portion of the apparatus;

Fig. 5 is a detail section, taken along plane 5—5 of Fig. 4;

Fig. 10 is a sectional view, taken along plane 10—10 of Fig. 2.

My cooking device can be used in several ways; for example, for toasting, as well as for broiling. Although in the following description the process of broiling meat will be more specifically described, it is therefore to be understood that the apparatus can as well be used for toasting sandwiches, bread, or the like, or for performing other cooking operations.

Figure 1:
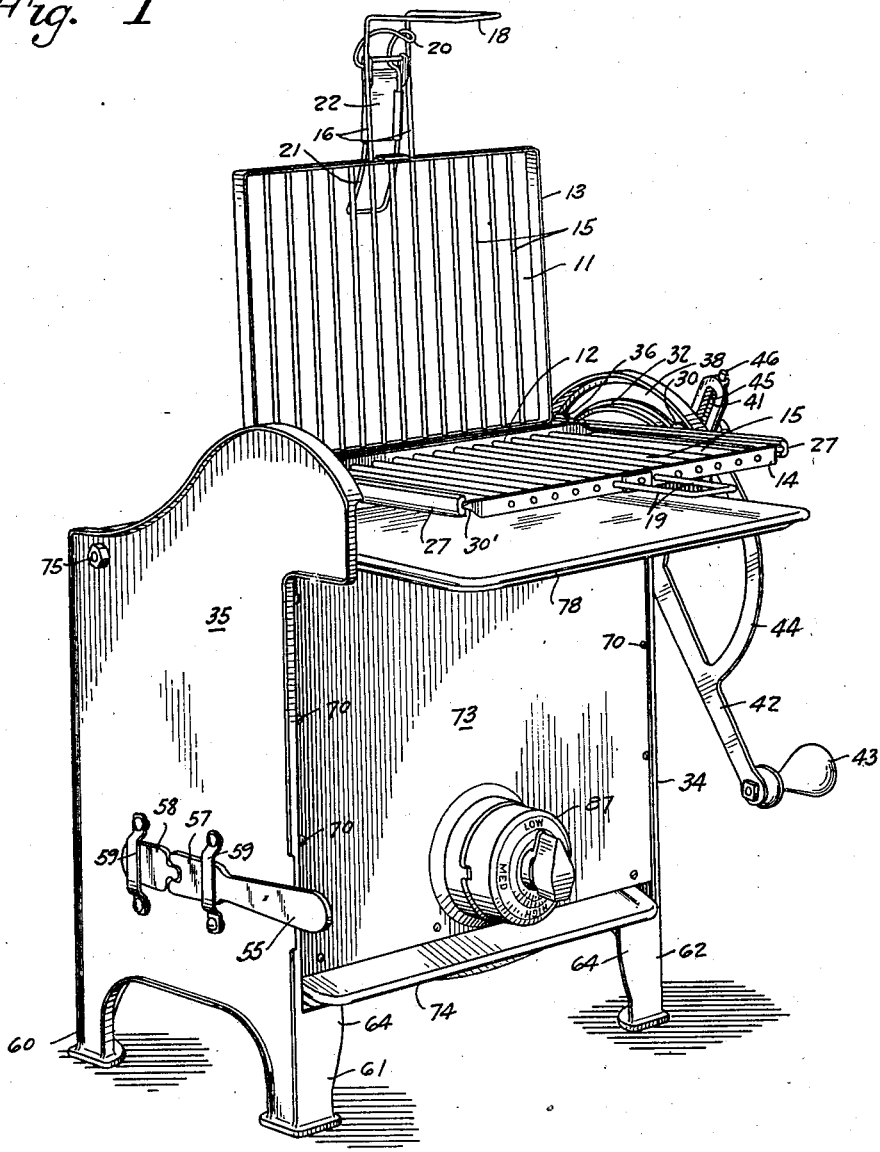
Figure 1 is a perspective view of a broiler embodying my invention.

The meat to be broiled, or the food to be toasted or cooked, is arranged to be accommodated in a suitable support, such as a hinged rack or grid of conventional form. This rack is shown in Fig. 1, as having a pair of rectangular rack parts 11 and 12 hinged together at their rear edges. These rack parts are shown in open position in Fig. 1, ready for the placing of the food on the part 12. After the food is thus placed on rack 12, the upper rack 11 is brought down over rack 12, the meat or food thus being held between the two parts. These racks each have a frame or rim 13 and 14, to which the rack wires or rods 15 can be secured to form grids.

Figure 6:
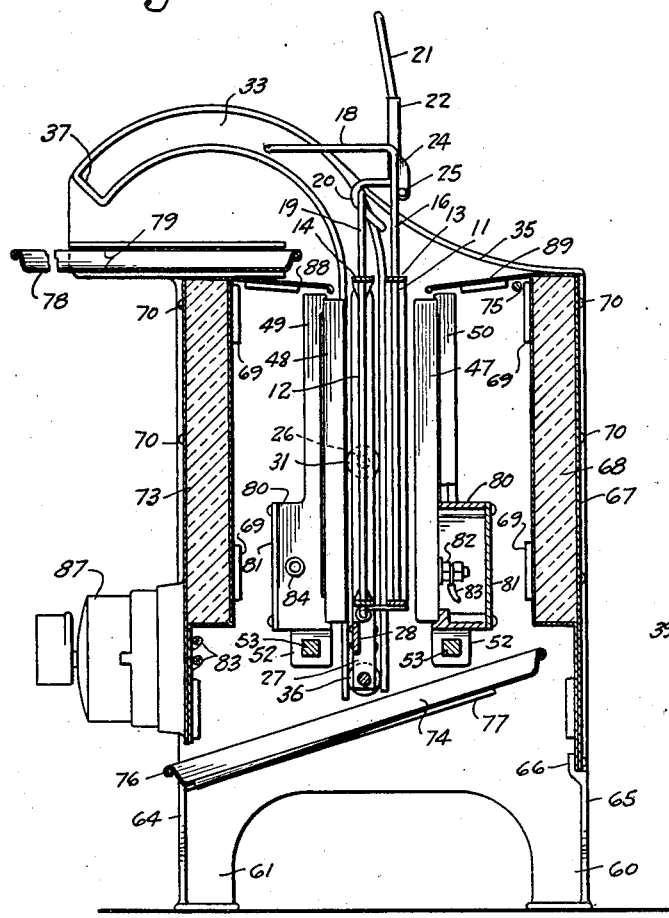
Fig. 6 is a sectional view of the entire apparatus taken along plane 6—6 of Fig. 2.

After the food is placed in the rack in the manner just described, the rack parts 11 and 12 can be fastened together at their front edges, in a manner to be hereinafter described. For the present, attention is called to the fact that the loaded rack can be supported on the mechanism in the horizontal position of Fig. 1; and can be moved from that position to another one, such as a vertical position as shown in Fig. 6, where the food can be acted upon by heating elements.

Figure 9:
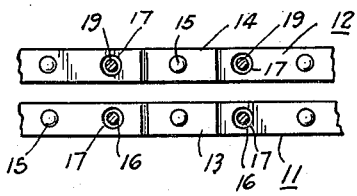
Fig. 9 is a sectional view, taken along plane 9—9 of Fig. 8.

I shall now describe the latching device for the rack. The upper rack 11 has a pair of rods 16 which form elements of the grid at about the central portion of the rack, and extend beyond the frame 13 through clearance holes 17 (Fig. 9) to provide a handle extension 18. This extension is horizontal and projects away from the rack when in the active position shown in Fig. 6, whereby it remains cool. The lower rack 12 has a pair of similar rods 19 forming an extension loop adapted to be engaged by a catch mechanism supported on the upper rack 11. Since wires 16 and 19 are fastened to frames 13 and 14 only at the rear edges of these frames (they having clearance holes such as 17 at their front edges), it is evident that these wires can be easily flexed to provide a resilient support and hook for the catch, whereby slight variations in the thickness of the food held by the rack have no effect upon the latch engagement.

Figure 8:
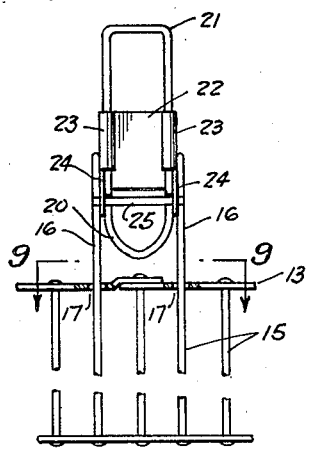
Fig. 8 is a detail showing the rack structure.

The latch proper is in the form of an arcuate wire hook 20. With this hook is integrally formed a latch handle 21. This hook structure is stiffened and held together by a sheet metal hinge piece 22, looped around handle 21 as indicated at 23 (Fig. 8). It also has a pair of apertured ears 24, by the aid of which the entire latch can be pivoted, as on a short rod 25 extending between wires 16 and fastened thereto, as by soldering. The curvature of hook 20 is such that it is retained in the locking position of Fig. 6, even when a resilient force exists, tending to separate the two racks 11 and 12. Furthermore, the larger portion of the weight of the latch structure is on the handle end, whereby in the open position of Fig. 1, the handle 21 stays against rack 11, the hook 20 being raised out of the way and ready for engagement with the loop 19 when the two racks are brought together.

The manner in which the rack stucture 11—12 is movably supported will now be described. A moving frame is shown, comprising a shaft 26 (Figs. 3, 6 and 7) to which is rigidly fastened a pair of spaced, grooved guides 27. The guides are of rectangular section, and are further braced by a cross strip 28 (Fig. 6) fastened to both guides. The grooves 29 in the guides 27 face each other, and are intended to accommodate the sides of frame 14, which are purposely bent to a cross position, as indicated at 30. The frame 14 is so proportioned that it can be easily sprung into grooves 29, whereby the entire rack assembly can be supported on the movable guides 27.

The shaft 26 has loosely mounted thereon a pair of guide rollers 30 and 31; and these operate in grooves 32 and 33 respectively, formed in a pair of castings 34 and 35. These castings will be described in detail hereinafter; for the present it is sufficient to note that they form the main supports for the entire apparatus. The movement of guides 27 is further guided by additional rollers 36 (Fig. 6) which are supported below rollers 30 and 31 on the guides and also operate in the grooves 32 and 33. It is thus evident that by properly forming grooves 32 and 33, the guide supports 27 can be supported on the four rollers therein, in such manner that these supports can be moved from the vertical position of Fig. 6 into the horizontal position of Fig. 1. Thus the grooves 32 and 33 have vertical portions in which the rollers 36 are directly vertically below the rollers 30 and 31 on shaft 26; as well as arcuate portions, in which the rollers, in each groove, are in horizontal relation, permitting racks 11 and 12 to be opened and closed. The curved portion of the grooves has a stop, such as 37 (Fig. 6) whereby overtravel of supports 27 beyond the horizontal position is prevented.

Figure 7:
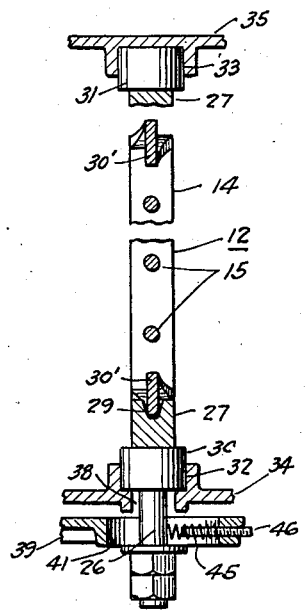
Fig. 7 is a detail sectional view, taken along plane 7—7 of Fig. 3.

In order to move the guides 27 along the grooves 32 and 33, mechanism is provided, operating on an extension of shaft 26 (Fig. 7). This shaft extends through the elongated aperture 38 in the side frame 34, said aperture having the same general configuration as groove 32, and communicates with the bottom of the groove. An arm 39 (Fig. 3) pivoted at 40 to frame casting 34, has an elongated slot 41 encompassing shaft 26, as shown most clearly in Fig. 7. By rotating arm 39, it is possible to move shaft 26, and the structure supported thereon, along grooves 32 and 33. The arm 39 is adapted to be rotated by a handle extension 42 connected to arm 39, and carrying a horizontally extending handle 43 at its extremity. A stiffening connection 44 is provided for the lever arrangement 39—42.

In order to assist in moving the shaft 26 upwardly out of the bottom of aperture 38, as lever arm 42 is rotated in a counter-clockwise direction, and to overcome to some extent the friction between the moving parts supported on shaft 26, there is provided a spring 45, compressed between the shaft 26 and the end of slot 41 in arm 39. In order to hold the spring properly in place, a spring post 46, in the form of a screw, extends through the end of arm 39 and into the spring. Referring to Fig. 3, it is evident that the force of the spring 46 is in a direction tending to lift shaft 26.

The pivot 40 of arm 39 is so located with respect to grooves 32 and 33 that during the first lifting movement from the position of Fig. 3, the shaft 26 moves radially inward toward this pivot. The inward movement evidently continues until the center of shaft 26 and pivot 40 fall on a horizontal line. The spring 45 assists this inward movement. As the arm 39 is moved further, and out of its horizontal position, the shaft 26 recedes from the center 40; but during the last portion of the movement, the shaft 26 again moves towards the center. This is due to the fact that the guiding grooves 32 and 33 have a center of curvature above the axis of arm 39. This inward movement of the shaft 26 during its last phase assists in holding the rack support 27 in horizontal position; for any tendency to move it backward is opposed by spring 45, which must be compressed as shaft 26 moves outwardly from pivot 40 in response to the displacement of the support from horizontal position.

The structure of the rack 11—12 and its operating parts is now complete. When the rack is in the position of Fig. 6, the food held therein is cooked or broiled by one or more electrical heating elements. In this instance, a pair of elements 47 and 48 is disclosed, located in spaced vertical relation, one on each side of the rack structure 11—12. These elements can comprise a refractory support for the resistance wires, which can be exposed on one side of the support in order to radiate a large amount of heat directly to the food in the rack 11—12. Skeletonized frame supports 49 and 50 are provided for the elements, which are fastened by appropriate fastening means to the lugs 51 arranged on the back of the frames.

These frame supports 49 and 50 are mounted adjustably, so that the heating elements 47 and 48 may be brought closer to, or farther away from the rack 11—12. For this purpose, each of the supports is provided with a pair of ears 52 through which a square shaft 53 is passed. One end of each shaft is provided with a round portion 54 (Fig. 2), by the aid of which it is journaled for rotation in the side frame 34. The shafts 53 extend entirely across from frame 34 to frame 35. Outside of frame 35, one of the shafts is fastened to a handle member 55 which has a round boss 56 (Fig. 5) journaled in a hole in frame 35. It is thus evident that rocking of handle 55 will cause rocking of element 48 about the axis of shaft 53. In order to rock the other element 47 about the axis of its shaft 53, the handle 55 has a toothed extension 57 which engages a toothed arm 58 fastened to the shaft 53. This arm is likewise provided with a round boss similar to boss 56, to journal it in frame 35.

As thus far described, it is evident that the heating elements can readily be removed simply by removing the square shafts 53, with their arms 55 and 58, from the ears 52. This may be desirable for repair or replacement. Under ordinary circumstances, however, the shafts are retained against removal by a pair of straps 59 extending across the shaft ends 53 on the frame 35. These straps also frictionally engage the outer surfaces of arms 57 and 58, whereby these arms are frictionally retained in any set position. When it is desired to remove either shaft 53, the corresponding strap 59 is first taken off.

The manner in which the side frames 34 and 35 are held together to form a box-like structure enclosing the heating elements, will now be described. Each of the side frames 34 and 35 has a pair of legs, such as 60, 61, and 62, 63. Legs 61 and 62 have a front web 64 extending toward each other, as seen most plainly in Fig. 1. The rear legs 60 and 63 have somewhat similar extensions 65 (Fig. 6), at the top of each of which there is an offset flange 66 for the accommodation of the bottom edge of the back 67. This back is formed of sheet metal, enclosing heat insulation material 68 to prevent substantial heat radiation in an undesired direction. The insulation 68 extends to the top of frames 34 and 35, and far enough downwardly so that its lower edge is about on the same level as the bottom of the heating elements. The back 67 is held in place partly by the aid of lugs 69 on the frames, contacting with the inner side of the back; screws or other fastening means 70, passing through a series of small lugs 71 on the frames, hold the back firmly in place. The insulation 68 is cut away at one edge, as clearly indicated in Fig. 10, to permit the entire back 67 to be slipped in or out between the projections 69 and 71. In order to stiffen the frame, as well as to improve its appearance, a beading 72 around its edge can be provided.

The front 73 is of substantially similar construction, and is held in place by similar means, except that the supporting flange, the equivalent of 66, is omitted, in order to permit the passage of a tray 74, as will be hereinafter described. In order further to stiffen the structure, a through bolt 75 can be provided near the upper rear edge of the structure.

The tray 74 is removably held in slanting position beneath the heating elements 47 and 48, and serves to catch the drip from the food that is cooking. It is formed of a metal sheet, having a rim turned over a wire 76, and having a central bulge or depression, apertured for the discharge of the collected dripping. To hold the tray in the slanting position of Fig. 6, the frames 34 and 35 are each provided with a slanting rest 77 on which the sides of the tray rest. It is prevented from sliding off these rests 77 by the front flanges 64 of feet 61 and 62, which extend slightly higher than the front end of these rests, as clearly shown in Fig. 6 and 2.

In order to catch the drippings when the rack is in the horizontal position of Fig. 1, there is provided another removable tray 78, of substantially similar structure to tray 74. However, it has no central bulge, and is held in horizontal position beneath rack 12 by the aid of grooves 79 in the frames 34 and 35. Both of the trays can obviously be removed for cleaning.

It is further evident that the device can be advantageously used in a multiple series in large restaurants, side by side. The food can be quickly placed into cooking position and left there until completed. The operator soon learns the best mode of operation as regards the adjustment of the elements by handle 55, which of course may be varied in accordance with the kind and quality of the food being cooked.

There remains to be described the manner in which the connections are led to the heating elements 47 and 48, and the electrical control thereof. For this purpose, each of the frames 49 and 50 is provided with a box-like projection 80 into which the element terminals 82 project. These projections can be covered by a removable plate 81. The wires 83 can lead to the terminals through a short pipe 84 threaded into the wall of projection 80. Frame 34 is provided with oval apertures 84' (Fig. 3) through which the wires can be led from outside the structure. A removable plate 85 can serve to cover these apertures neatly; in this cover plate a bushing 86 is provided through which the wires 83 can be led underneath the cover. A snap switch 87 or the like serves to control the degrees of heat and the circuits for the elements. This can be supported on the front 73.

It is evident that tray 74 serves efficiently to prevent any material draft upwardly between the heating elements, and the induction of cool air from the bottom. In this way, the efficiency of the device is increased. For similar reasons, deflectors 88 and 89 (Fig. 6) are supported at the top to cover the entire top except where the rack structure 11—12 passes into the apparatus. Thus material loss by heat convection is eliminated.

I claim:

1. In an electrical cooking device, a rack, a movable support for the rack, means forming a guide in which the support, as it moves thereon, turns the rack from a substantially vertical position to a substantially horizontal position, and a heating element arranged adjacent the rack when in vertical position.

2. In an electrical cooking device, a structure open at the top, a pair of vertically arranged heating elements within the structure, a rack, and means forming a guide whereby the rack can be moved into the structure from the top between the elements, said guide being so constructed as to cause the rack to move in a path that departs from a straight line.

3. In an electrical cooking device, a structure open at the top, a heating element within the structure, a rack, a movable support for the rack, and means forming a curved guide for the support, whereby it can be turned from a substantially horizontal position adjacent the structure, to a substantially vertical position within the structure adjacent the heating element.

4. In an electrical cooking device, a box-like structure, a pair of spaced, substantially vertically arranged elements, in the structure, means forming a pair of grooved guides one at each side of the structure, a support movable on the guides, said guides having a vertical portion whereby the support is positioned thereby between the elements, as well as a curved portion whereby the support as it moves outwardly, assumes a substantially horizontal position at the end of its movement, and a lever arm for moving the support in the guides.

5. In an electrical cooking device, a heating element, a two part hinged rack arranged to be positioned adjacent said element, each part of the rack having a series of bars forming a grid-like structure, and a frame supporting said bars, the center bars of each part extending loosely through the frame to form on one part, a handle, and on the other, an element capable of being engaged by a catch, and a catch pivoted to the part which has the handle, and adapted to engage said element.

6. In an electrical cooking device, a heating element, a movable support arranged to be moved toward and away from the element, said support having a pair of spaced, grooved guides, the grooves facing each other, and a rack frictionally engaged in said grooves.

7. In an electrical cooking device, a structure having a pair of side frames, each of said frames having a guide formed thereon, a support movably mounted in the guide, a heating element in the structure and arranged to be adjacent the support when it is in one of its positions, said guides having a curved portion whereby the support turns as it is moved away from the element, and a vertical portion permitting the support to drop into a position adjacent the element, and means for moving said support, comprising a shaft passing through an elongated aperture in one of the frames and fastened to the support, and a pivoted arm having a slot engaging the shaft.

8. In an electrical cooking device, a structure having a pair of side frames, each of said frames having a guide formed thereon, a support movably mounted in the guide, a heating element in the structure and arranged to be adjacent the support when it is in one of its positions, said guides having a curved portion whereby the support turns as it is moved away from the element, and a vertical portion permitting the support to drop into a position adjacent the element, and means for moving said support, comprising a shaft passing through an elongated aperture in one of the frames and fastened to the support, a pivoted arm having a slot engaging the shaft and a spring in the slot for resiliently urging the shaft toward the axis of the pivoted arm.

9. In an electrical cooking device, a pair of spaced heating elements, a support movable between the elements, and a rotatable shaft for each element for adjusting their relative positions.

10. In an electrical cooking device, a pair of spaced heating elements, a support movable between the elements, and means for pivotally moving each of the elements about an axis adjacent one of its edges, comprising a pair of shafts on which the elements are respectively supported, and interengaging arms connected to the shafts.

11. In an electrical cooking device, a casing, a heating element, and means for rotatably supporting the element in the casing, comprising a shaft journaled in one side of the casing and supporting the element, a handle fastened to the other end of the shaft, and a strap for preventing the shaft from being withdrawn, and frictionally engaging the handle for permitting adjustment of the shaft position.

In testimony whereof I have hereunto set my hand.

GEORGE F. WELLS.